Patented Sept. 5, 1933

1,925,135

UNITED STATES PATENT OFFICE 1,925,135

IODINE COMPOSITION

Wallace L. Chandler, East Lansing, Mich., assignor to Merck & Co., Inc., Rahway, N. J., a corporation of New Jersey No Drawing. Application March 13, 1926
Serial No. 94,619

7 Claims. (Cl. 167—70)

This invention relates to an improvement in the colloidal suspensoid described in my co-pending application for patent filed November 21, 1925, Serial No. 70,697. The colloidal suspensoid as described cannot be satisfactorily desiccated without altering its properties.

The object of the invention therein described is to produce a form or state of pure free iodine which is more active and more readily available for use as a disinfectant and for medical and surgical purposes than any of the known iodine preparations containing free, uncombined iodine.

It is the object of that invention to produce a permanent colloidal state of iodine which by virtue of the size and properties of the very small colloidal-like particles, remains in suspension in water, whatever the strength of the suspension, for a practical length of time to render it very highly useful in surgery and medicine and as a disinfectant.

The results of that invention are obtained by a modification and development of the process described in my United States Patent No. 1,535,450 for the production of crystalline iodine, namely to proceed under conditions of reduced temperature and in the presence of a protective colloid.

To produce the iodine suspensoid described in the said co-pending application Ser. No. 70,697, commercial crystalline iodine is treated in a glass or earthenware container with a dilute solution of the hydroxide of an alkali or alkaline earth metal until all of the iodine is used up and a straw-colored liquid results. (The strength of the hydroxide depends on the nature of the hydroxide used. In the case of sodium hydroxide a one per cent. solution appears to be best). This liquid appears to be a dilute solution of the metal iodohypoiodite or a mixture of the metal iodide and the metal hypoiodite. Chemical tests indicate the presence of the hypoiodite. The probable reactions are indicated by the following equation:

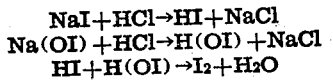

This straw-colored liquid is then immediately cooled to approximately 0° C. (by stirring broken ice or snow into the liquid or employing other means of cooling). A small amount of a colloidal carbohydrate, for instance gum arabic, or other suitable protective colloid is then added to the liquid. This may vary from 10 grams up to an excess of the colloid. The whole is then quickly acidified with a sufficient amount of hydrochloric acid or other strong acid to precipitate all of the iodine, the container being agitated during acidification. This process results in the production of a brick-red precipitate, or colloidal iodine, which is permanent. The probable reactions taking place are indicated by the following equation:

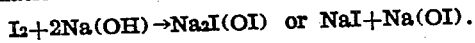

Any coarse crystalline iodine formed during this process for the production of the described iodine suspensoid may be separated from the colloid by passing the colloidal iodine through a paper filter. The sodium chloride formed during the process may be separated from the colloidal iodine by filtering through a Chamberland filter or by allowing the container (a tall one) to stand undisturbed for several days until the colloidal iodine is concentrated in the lower part of the container (the size of the particles, which is determined largely by the temperature at which the process is carried out, determines the rate of settling), and then siphoning off the sodium chloride solution. The small amount of iodine held in solution and in suspension by the sodium chloride may be recovered by the usual processes of iodine recovery. The colloidal-like iodine from which the sodium chloride has been siphoned may be diluted with water to any desired strength, the strength of the suspension being determined by direct titration with sodium thiosulphate.

Some permanent colloidal iodine, together with small ellipsoidal crystals, may be formed as the result of acidifying a mixture of solutions of iodides and iodates under conditions of reduced temperature and in the presence of a protective colloid, as gum arabic, or by employing a part of these modifications. For example: If a mixture of dilute solutions of sodium iodide (five parts) and sodium iodate (one part) is treated with gum arabic and then acidified with hydrochloric acid, the resulting precipitate, which has a violet tinge, is composed of a mixture of colloidal iodine and larger but still minute ellipsoidal crystals exhibiting a Brownian movement when observed under the microscope.

The colloidal iodine, of the said specification Ser. No. 70,697, in suspension is brick red in color. When prepared with great care under perfect conditions it is lighter in color and seems white in small amounts. Being in a colloidal-like state, this form of iodine is very active. It is quickly soluble in water and thus free iodine is immediately available for most of the uses to which iodine is put, and the possible uses of iodine are thereby extended.

It is the purpose of this present invention to so treat the colloidal suspensoid above described in order that it may be desiccated and reduced to a stable powder, a candy-like solid, or a thick syrup; and yet, when treated with water, will immediately make the original colloidal suspensoid again available for medical and surgical application in aqueous suspension.

I accomplish this purpose by concentrating the colloidal suspensoid according to processes described in my co-pending application, as above set forth and then mixing it with an amount of a suitable carbohydrate (one which in concentrated form is neutral to iodine, is readily soluble in water and the aqueous solution or syrup of which will, when concentrated and exposed to air at room temperature, form a film on its surface of such nature that the iodine molecule cannot pass through this film), so that a film is quickly formed on the surface of the mixture, permitting the evaporation of the unbound water content and at the same time preventing the escape of the iodine molecule.

To state it in detail, to one part of the colloidal suspensoid, having the finely divided or colloidal iodine content of 30%, is added three parts of corn syrup (Karo brand) of the usual consistency of the commercial brand of such syrup. While the colloidal iodine content of 30% appears best, the concentration of the suspensoid is immaterial within comparatively broad limits. The essential thing is that the concentration be sufficient that on treating the finished product with water a sufficient amount of colloidal iodine will be liberated for the disinfection of wounds without the liberation of an excess of syrup.

This mixture is then thoroughly stirred to insure the uniform distribution of the iodine particles. It is then poured into shallow vessels of a vitreous nature and the vessels are allowed to stand uncovered in a dry warm room for twenty-four hours. This apparently permits the evaporating of water so that a film is formed on the surface of the mass embracing the iodine particles. The mixture is then transferred to covered glass jars and stored for further use.

The process may also be carried out by mixing with the colloidal suspensoid the carbohydrate in powdered form instead of the syrup. The following procedure obtains good results:—

To one pound of desiccated powdered dextrose is added one pint of the colloidal suspensoid having a colloidal iodine content of about 30%. This mixture is then handled in the same manner as described in the case where the syrup is used. The use of the powdered carbohydrate instead of the syrup facilitates desiccation, although the desiccated product is more brittle.

Or, the process may be carried out by using both the syrup and the powdered carbohydrate. The following procedure proves to be satisfactory:—

To one pint of the colloidal suspensoid having a colloidal iodine content of 30% is added one pint of corn syrup and one pound of desiccated powdered dextrose. This mixture is then handled in the same manner as described in the case where the syrup alone is used. Desiccation is accomplished more rapidly than in the case where the syrup alone is used and the desiccated product is less brittle than in the case where the desiccated sugar alone is used.

In the preparation of the powdered product, the syrup is desiccated until brittle; then powdered in a mortar or any suitable mill or powdering device. Tablets may be prepared from the powdered material by usual methods and pills may be made from very thick syrup by the usual methods. The thick syrup may be loaded into gelatin capsules or tubes or gelatin-lined metal tubes for use as a paste.

Swabs are prepared on suitable handles by dipping the ends of such handles, as strips of wood, paper, glass or other suitable material, into the thick syrup and slowly drying the adherent material. A cotton swab may be similarly prepared, the cotton adding bulk; or, the strips of wood or other material may be tipped with the thick mixture, dried and the tipped end then wound with cotton to increase the water holding capacity of the applicator.

The solid, candy-like material is prepared by filling shallow jars with the thick syrup and allowing the jars to stand open in a warm dry room or in vacuo until the contents are quite hard. This usually requires several days at room temperature.

The uses of the various forms of this improved iodine composition are as follows:

The powdered product, when placed in water, instantly liberates the iodine particles, thus giving the original colloidal aqueous suspensoid. The powdered product is particularly advantageous where it is desired to prepare small amounts of the colloidal suspensoid. The powder is useful in making milk solutions of iodine for internal administration, for iodizing water, and for many other uses.

The tablets and pills will have the same uses as the powder but may be considered more convenient because of the exact quantity or dose contained in each.

The swabs or tipped sticks will prove an ideal method of carrying iodine for emergency uses. They will eliminate the necessity of carrying an iodine bottle which often breaks or eats through and destroys the bottle stopper and damages all that it contacts with. The sticks tipped with this improved iodine composition are permanent and may be carried loose in the pocket or the luggage of travelers without danger of decomposing the material or damage from contact or corrosion. By simply dipping the tipped ends of the sticks in a little water, or in the absence of water, saliva, the colloidal aqueous suspensoid is immediately formed on the surface of the wetted material and may then be applied as to a wound or where the painting of a surface with iodine is indicated. The excess moisture on the surface may then be immediately wiped off of the swab and the unused part is thus saved for future use.

The solid product in jars will be found serviceable in hospitals or physicians' offices where a large quantity of iodine is used. It can be used by simply wetting a usual cotton swab with water, rubbing it over the surface of the material, and applying the resultant aqueous colloidal suspensoid from the saturated cotton to the area to be treated.

My improved iodine composition may be considered as a colloidal suspensoid similar to that described in my said co-pending application, but in which the syrup has replaced water as the external phase, and is itself readily replaced by water. Its stability probably depends on the inability of the iodine molecule to pass between the tightly massed particles of the carbohydrate concentrated on the surface of the mixture.

While there is probably a wide range of choice as to a carbohydrate which will accomplish the intended purpose to a practical degree, certain carbohydrates are apparently unsatisfactory; such are starch, cellulose and perhaps some of the gums. Dextrose in either powdered or syrup form, or both, will probably continue to be the first choice, apparently satisfying the requirements to the greatest degree.

Gum arabic is another suitable form of carbohydrate material adaptable for the purpose, being neutral to iodine, fairly easily soluble in water, and possessing the before-mentioned property of forming a semi-permeable film, permitting the evaporation of water but not allowing the iodine vapors to pass through in the process of thickening or solidifying the mixture of the aqueous iodine suspensoid and the added solution of carbohydrate colloid.

The kind of carbohydrates, enumerated above, as generally unsatisfactory, are such as lack one or more of these properties to a greater or less degree.

After complete or partial solidification with the described suitable forms of carbohydrate materials, these being again fairly easily re-soluble in water, the iodine compositions of this invention, may be conveniently used for medical and surgical purposes by moistening and applying the same to the parts to be treated.

Whenever reference is made to "colloidal iodine", as such, in this specification and the claims, it is intended to mean the elementary iodine suspensoid of the co-pending application, namely, the iodine in a state of extremely fine subdivision with its protective colloid as described in that application.

Having thus described my invention what I claim as new and desire to secure by Letters Patent is:

1. A composition comprising a colloidal suspensoid in which finely divided elementary iodine with a protective colloid constitutes the internal phase and carbohydrate syrup constitutes the external phase.

2. As a step in the manufacture of a solid elementary iodine composition, the admixture of colloidal iodine suspensoid, comprising finely divided elementary iodine and a protective colloid derived from gum arabic, in aqueous suspension with a carbohydrate neutral to iodine and capable of forming a semi-permeable surface film on exposure to air.

3. The process involving the admixture of an aqueous colloidal elementary iodine suspensoid and a carbohydrate neutral to free iodine and capable of forming a semi-permeable surface film on exposure to air, said film being permeable for water but not for iodine vapor, allowing the same to stand until substantially all the water has evaporated.

4. The process involving the admixture of an aqueous colloidal elementary iodine suspensoid, with a protective colloid and a carbohydrate solution, neutral to free iodine and capable of forming a semi-permeable surface film on exposure to air, said film being permeable for water but not for iodine vapor, allowing the same to stand until substantially all the water has evaporated, and reducing to a powder.

5. A composition comprising elementary iodine in a state of fine subdivision with a protective colloid, in a carbohydrate body which makes the contained iodine substantially nonvolatile.

6. A solid composition comprising a colloidal suspensoid in which finely divided elementary iodine with a protective colloid constitutes the internal phase and a carbohydrate colloid neutral to iodine constitutes the external phase.

7. A composition comprising a colloidal suspensoid in which finely divided elementary iodine with a protective colloid obtained from gum arabic, constitutes the internal phase and a carbohydrate solution constitutes the external phase.

WALLACE L. CHANDLER.